Aug. 22, 1939.　　　　C. C. FARMER　　　　2,170,238
HAND BRAKE RELEASE CONTROL
Filed Oct. 8, 1937　　　4 Sheets-Sheet 1
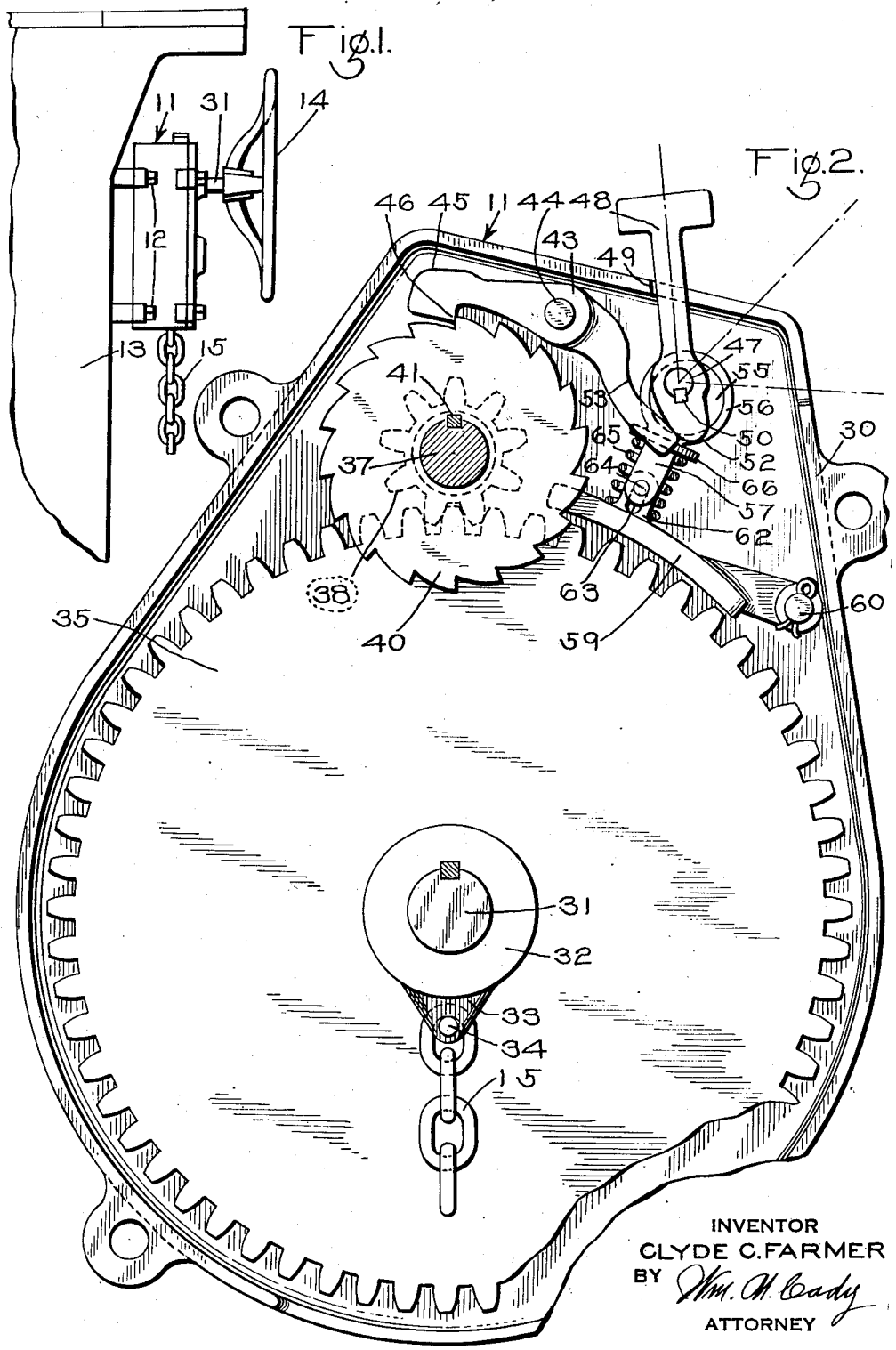
INVENTOR
CLYDE C. FARMER
BY Wm. H. Cady
ATTORNEY Aug. 22, 1939.  C. C. FARMER  2,170,238
HAND BRAKE RELEASE CONTROL
Filed Oct. 8, 1937  4 Sheets-Sheet 2
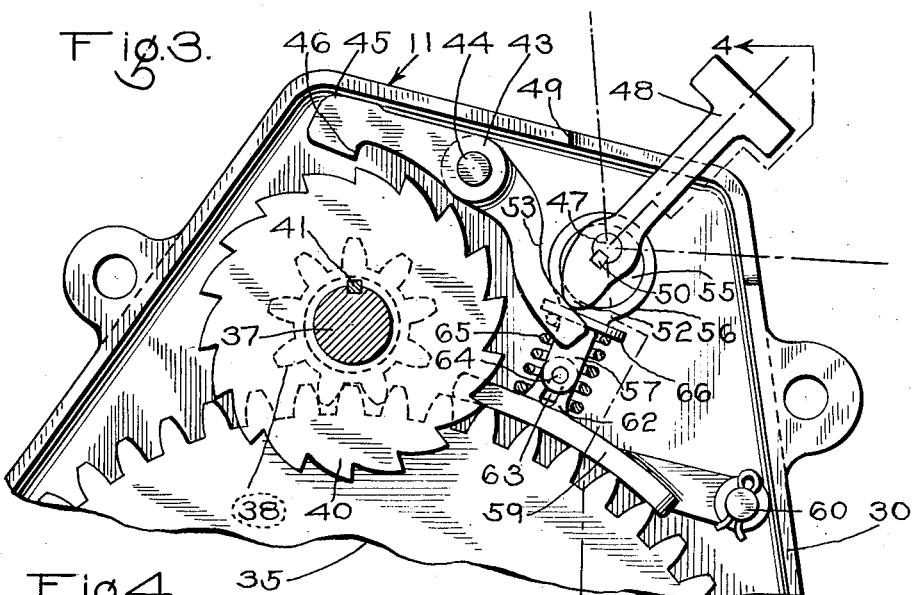
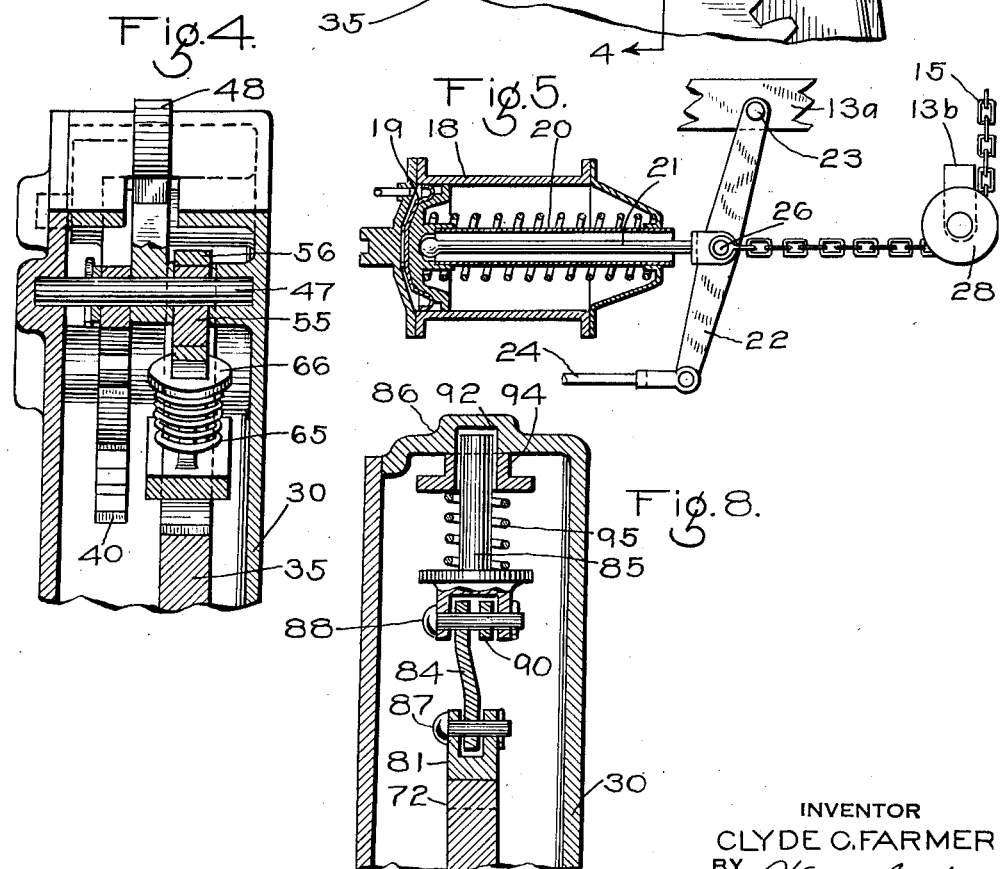
INVENTOR
CLYDE C. FARMER
BY *Wm. M. Cady*
ATTORNEY Aug. 22, 1939.  C. C. FARMER  2,170,238
HAND BRAKE RELEASE CONTROL
Filed Oct. 8, 1937  4 Sheets-Sheet 3
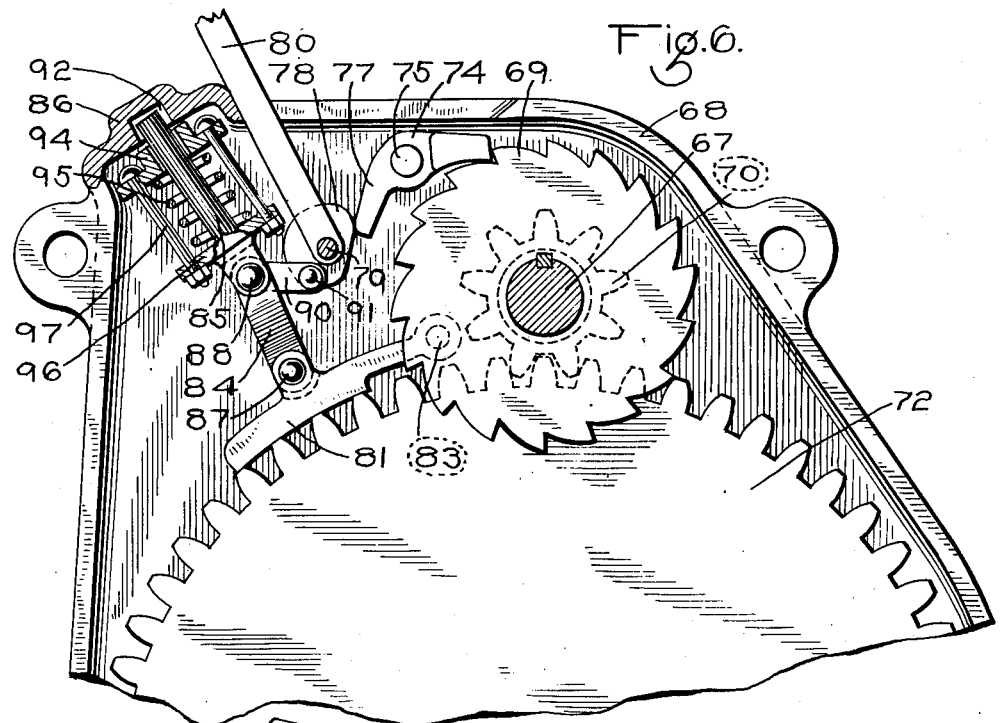
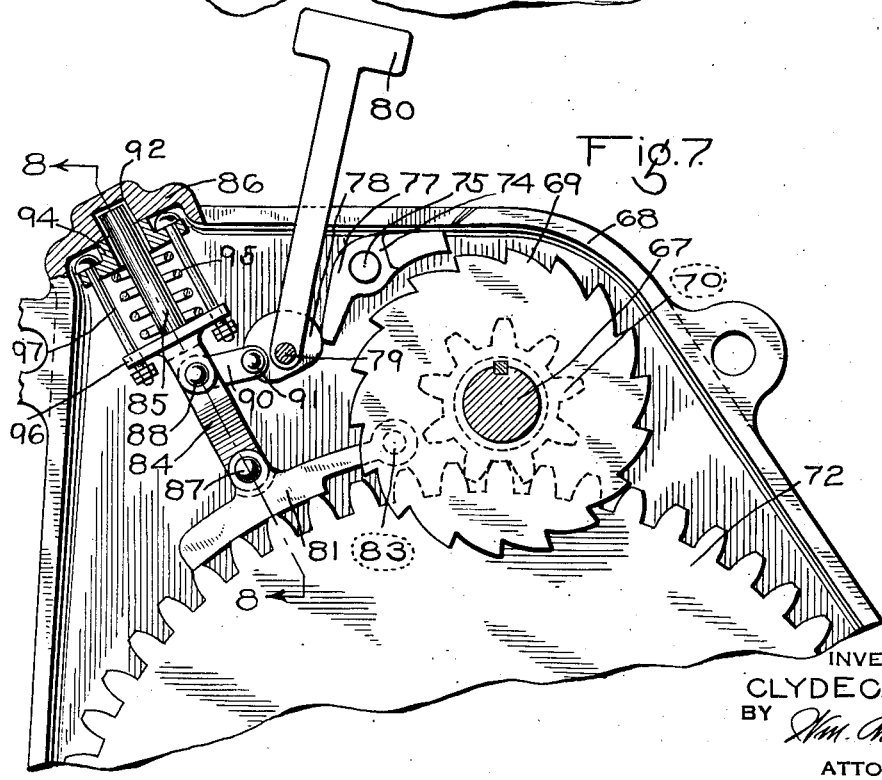
INVENTOR
CLYDE C. FARMER
BY
*Wm. M. Cady*
ATTORNEY Aug. 22, 1939.                C. C. FARMER                 2,170,238
                       HAND BRAKE RELEASE CONTROL
                        Filed Oct. 8, 1937           4 Sheets—Sheet 4
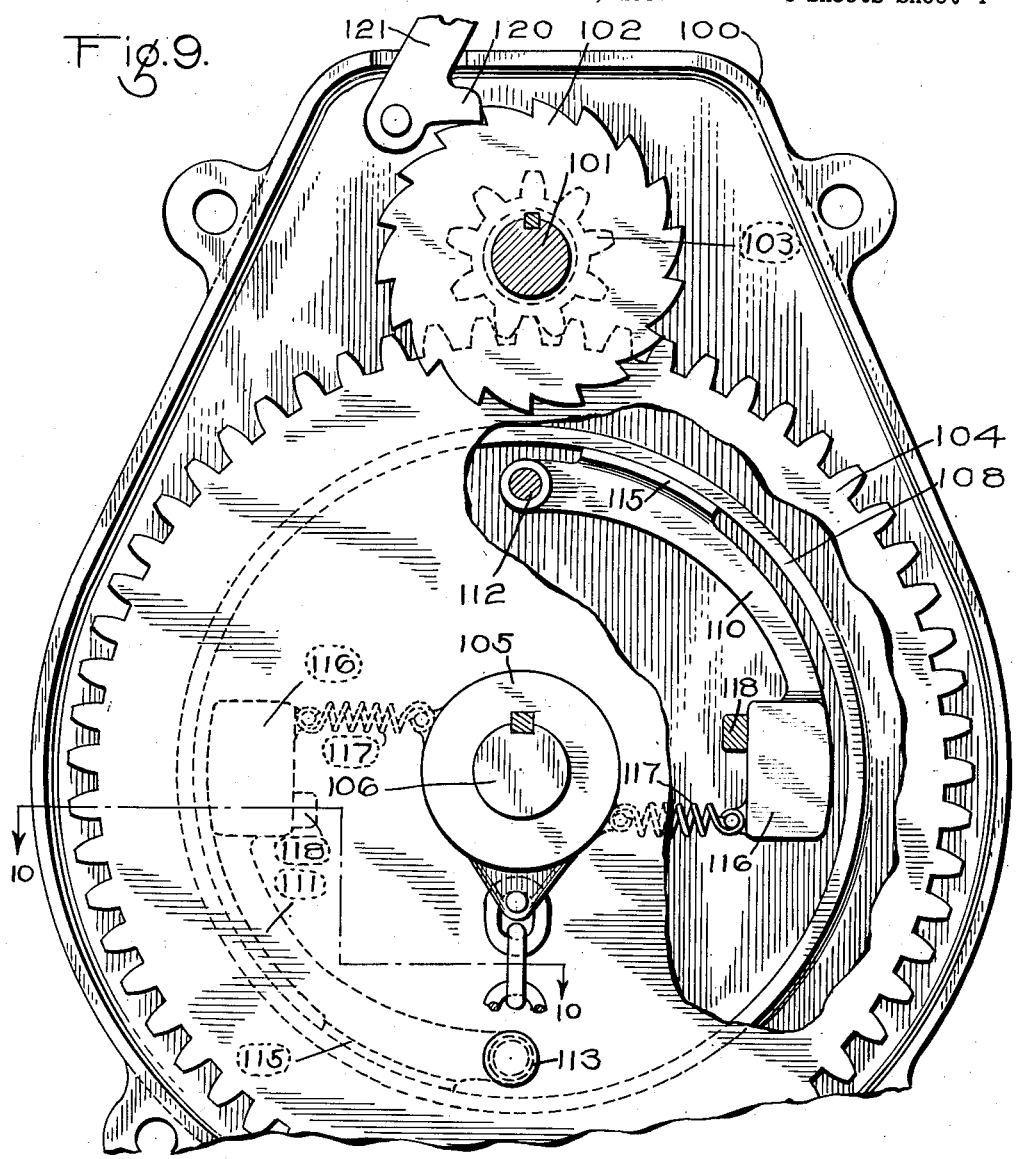
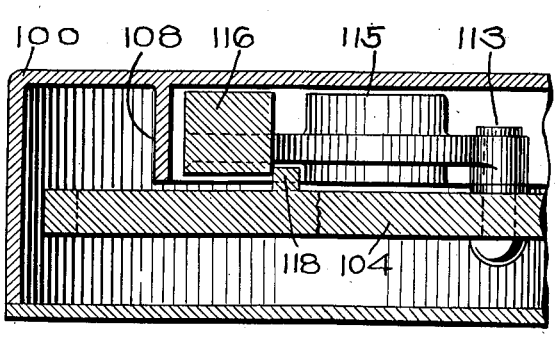
INVENTOR
CLYDE C. FARMER
BY Wm. M. Cody
ATTORNEY Patented Aug. 22, 1939

2,170,238

UNITED STATES PATENT OFFICE 2,170,238

HAND BRAKE RELEASE CONTROL

Clyde C. Farmer, Pittsburgh, Pa., assignor to The Westinghouse Air Brake Company, Wilmerding, Pa., a corporation of Pennsylvania Application October 8, 1937, Serial No. 167,910

16 Claims. (Cl. 74—505)

This invention relates to braking apparatus for railway vehicles, and more particularly to the type employing a brake staff or drum rotatable through the medium of a hand wheel to wind up a brake chain for effecting movement of the usual brake rigging levers to apply the brakes.

In hand brake mechanisms of the above type, the brake chain is usually connected, sometimes through the medium of one or more pull rods, to the brake cylinder push rod or to the brake cylinder lever, so that when the hand brake wheel is operated to wind up the brake chain for applying the brakes, the brake cylinder push rod in the brake cylinder is pulled toward its outer position and away from the brake cylinder piston, assuming, of course, that the air brakes are released. If the high powered hand brake mechanism on a car is thus operated to apply the brakes with maximum force, certain levers of the brake rigging are apt to be subjected to considerable tension in forcing the brake shoes against the car wheels, with the result that when the hand brakes are subsequently released, the brake rigging elements and the brake cylinder push rod may be suddenly impelled to release position with high velocity. Under such conditions, the impact of the returning brake cylinder push rod against the brake cylinder piston sometimes causes fracture of the brake cylinder piston and consequently the impairment of the air brakes on the car.

One object of my invention is to provide release control means for preventing the undesired action of the brake rigging when the hand brake is released as above explained.

Another object of the invention is to provide an improved hand brake mechanism embodying release control means automatically operative to retard the release operation of the hand brake sufficiently to prevent damage to the associated air brake apparatus on the car.

A further object of my invention is to provide release control means in a hand brake mechanism comprising a brake chain and a rotary drum for winding up the chain, which control means is operative on release of the brakes to apply sufficient braking force to the drum to prevent unwinding of the brake chain with excessive speed.

Other objects and advantages of the invention will appear in the following more detailed description thereof, taken in connection with the accompanying drawings, wherein:

Fig. 1 is a diagrammatic fragmentary view of the operating portion on the hand brake mechanism including the hand wheel;

Fig. 2 is a sectional view of a hand brake operating mechanism embodying one form of my invention;

Fig. 3 is a sectional view of the mechanism shown in Fig. 2 in another position thereof;

Fig. 4 is a sectional view taken on the line 4—4 of Fig. 3;

Fig. 5 is a fragmentary diagrammatic view of certain elements of a foundation brake rigging operatively connected to a brake cylinder and to a hand brake chain;

Figs. 6 and 7 are fragmentary sectional views of a hand brake operating mechanism embodying another form of the invention;

Fig. 8 is a sectional view taken from the line 8—8 of the Fig. 7;

Fig. 9 is a sectional view of a hand brake operating mechanism embodying a third form of my invention; and Fig. 10 is a sectional view taken on the line 10—10 of Fig. 9.

The hand brake with which my invention is adapted to be associated may be of any suitable construction, and as shown in Fig. 1 may comprise an operating mechanism 11 mounted by suitable means such as bolts 12 on the end of a car body 13, a hand wheel 14 for operating the mechanism 11, and a brake chain 15.

Referring to Fig. 5 of the drawings, the usual brake cylinder 18 is provided, within which is mounted a piston 19 carried on a hollow sleeve 20 which extends outwardly of the brake cylinder, the piston being adapted to operate the brake cylinder push rod 21, which is loosely mounted within the sleeve 20. The foundation brake rigging may be of any suitable construction, and as illustrated includes a brake cylinder lever 22 pivotally connected at one end to a pin 23 carried upon a portion 13a of the car body, and having the other end thereof operatively connected through the medium of a pull rod 24 to other levers and rods, not shown, comprising the usual brake rigging operative in the well known manner to apply the brake shoes to the car wheels. The outer end of the push rod 21 is pivotally connected by means of a pin 26 to the lever 22 intermediate the ends thereof, and the lower end of the brake chain 15 is likewise secured to the pin 26, the chain 15 being carried beneath the car body by engagement with a sheave 28, which is mounted on a bracket portion 13b of the car body. It should be understood that the elements of the brake equipment are shown in release position in Fig. 5, and that the application of the brake is effected on movement of the brake cylinder lever 22 in a counterclockwise direction about the pin 23, either by operation of the brake cylinder piston 19 acting through the medium of the push rod 21, or by operation of the hand brake apparatus through the medium of the brake chain 15 in the manner hereinafter explained.

As shown in Fig. 2 of the drawings, the hand brake operating mechanism 11 comprises a housing 30 having mounted therein a shaft 31, on which is rotatably mounted a suitably formed chain drum 32. Formed on the chain drum is a lug 33, to which the upper end of the brake chain 15 is secured by means of a pin 34. The drum 32 carries a gear 35, which may be integral with the drum and is disposed concentrically thereof. An operating shaft 37 is suitably journaled within the housing 30 parallel to the shaft 31, and has mounted thereon a pinion 38 operatively engaging the gear 35, and a ratchet wheel 40, both of which are secured to the shaft by suitable means such as a key 41.

Associated with the ratchet wheel 40 is a pawl 43, which is pivotally mounted intermediate its ends on a pin 44 secured to the housing. The pawl 43 has a weighted end 45 provided with a tooth 46, which is normally held in engagement with one of the teeth of the ratchet wheel 40 by the force of gravity, and is suitably formed to prevent rotation of the ratchet wheel in a counterclockwise direction while permitting rotation thereof in the opposite direction. The tooth 46 is adapted to be lifted out of the path of the teeth of the ratchet wheel when the pawl 43 is tilted in a clockwise direction about the pin 44, as hereinafter explained.

According to my invention, the hand brake mechanism 11 is provided with a manually operable release control device, by means of which a braking force is applied to the gear 35 to limit the speed of rotation thereof upon movement of the pawl 43 out of engagement with the ratchet wheel 40 in releasing the brakes on the car. As shown in Fig. 2 of the drawings, a shaft 47 is journaled in the housing 30, to which shaft is secured a handle 48 which extends outwardly of the housing through an opening 49, suitable means such as a key 50 being provided for preventing the handle from turning relatively to the shaft. Likewise secured to the shaft 47 are a cam 52, which is operatively engageable with a curved surface 53 of the pawl 43, and an eccentric disc 55 which is journaled in an annular strap portion 56 of a thrust member 57.

Associated with the thrust member 57 is a friction shoe 59 which is suitably formed for braking engagement with the peripheral surface of the gear 35, the shoe having one end pivotally connected to a pin 60 secured to the housing 30. The shoe 59 has formed thereon a lug 62 which is provided with a slot 63 and is pivotally connected to the lower end of the member 57 by means of a pin 64 having sliding engagement within the slot. A coil spring 65 is interposed between the upper surface of the shoe 59 and a collar 66 formed on the thrust member 57, which spring is adapted to urge the shoe 59 against the gear 35, when the hand brakes are being released as hereinafter explained, with sufficient force to prevent undesirably quick release action.

Assuming that the brake apparatus shown in Fig. 5 and the hand brake operating mechanism shown in Fig. 2 are in their release positions, if it is desired to apply the brakes by operation of the hand brake mechanism the usual hand wheel is operated to turn the shaft 37 in a clockwise direction, so that the pinion 38 is operated to rotate the gear 35 and the drum 32 in a counterclockwise direction about the shaft 31. As the drum 32 is thus rotated the upper portion of the brake chain 15 is wound about the drum in the well known manner, the lower end of the brake chain shown in Fig. 5 being thereby pulled toward the right so as to swing the brake cylinder lever 22 in a counterclockwise direction about the pivot pin 23. The associated elements of the brake rigging are thereby operated to apply the usual brake shoes against the wheels of the cars. It will be noted that as the brake cylinder lever 22 is thus operated, the push rod 21 is drawn toward the right-hand and out of engagement with the piston 19, which of course remains in release position.

It will be understood that as the shaft 37 and pinion 38 are turned in a clockwise direction for operating the gear 35 and drum 32 to wind up the brake chain 15, the tooth 46 on the weighted end of the pawl 43 rides over the inclined teeth of the ratchet wheel 40, which rotates with the shaft. The pawl 43 is at this time effective, however, to prevent rotation of the ratchet wheel in a counterclockwise direction. Accordingly, when the brake chain has been taken up sufficiently to apply the brakes on the car with the desired force, thus putting the elements of the brake rigging, including the members shown in Fig. 5 of the drawings, under considerable tension, the brakeman may safely release his hold on the brake wheel, the brakes being then held applied due to the locking engagement of the tooth 46 of the pawl with one of the teeth of the ratchet wheel 40, as shown in Fig. 2.

When it is desired to effect the release of the brakes, the handle 48 is moved to the right, thereby rotating the shaft 47 in a clockwise direction so as to turn the cam 52 into operating engagement with the surface 53 of the pawl 43, and also to turn the eccentric disc 55 for shifting the thrust member 57 and the friction shoe 59 toward the gear 35.

As the handle 48 is moved into the position illustrated in Fig. 3 of the drawings, the cam 52 moves the pawl 43 in a clockwise direction about the pin 44 so that the tooth 46 thereon is withdrawn from engagement with the ratchet wheel 40, while at the same time the eccentric disc 55 forces the friction shoe 59 into braking engagement with the peripheral surface of the gear 35 through the medium of the thrust member 57 and the spring 65.

With a ratchet wheel 40 no longer locked against counter-clockwise rotation by the pawl 43, the various members of the brake rigging are free to return to release position in the usual manner, the gear 35 being rotated in a clockwise direction as the brake chain 15 is unwound from the drum 32. According to the invention, however, the pressure of the friction shoe 59 against the gear 35 is sufficient to prevent the gear from revolving at an excessive speed due to the great force with which the chain 15 is pulled downwardly by the releasing movement of the brake rigging members.

It will thus be apparent, referring to Fig. 5 of the drawings, that the brake cylinder lever 22 and the push rod 21 connected thereto are permitted to move from the brake application position to release position at a controlled velocity, so that the impact of the end of the push rod 21 against the piston 19 will be relatively light.

As the members of the brake rigging approach full release position, the force with which the upper portion of the brake chain 15 is pulled downwardly and unwound from the drum 32 is gradually diminished, and it is therefore desirable that the gear 35 be relieved of the pressure of the friction shoe 59 during the final stages of its release rotation. In order to complete the release of the brakes, the handle 48 is moved beyond the intermediate position illustrated in Fig. 3, thereby further turning the eccentric disk 55 until the member 57 is moved so as to lift the shoe 59 away from the gear 35. It will be noted, however, that due to the conformation of the surface 53 of the pawl 43, this movement of the handle 48 and of the cam 52 will not effect any change in the position of the pawl, so that the ratchet wheel 40 can be rotated in a counterclockwise direction by the gear 35 as the brakes are finally released. After the brakes are released, the handle 48 may be returned to the normal position as shown in Fig. 2.

Referring to Figs. 6 and 7 of the drawings, there is shown a hand brake operating mechanism embodying another form of my invention, which operating mechanism is of substantially the same construction as that shown in Fig. 2 and comprises an operating shaft 67 rotatably mounted within a housing 68 and having keyed thereon a ratchet wheel 69 and a pinion 70, the pinion being in operative engagement with a gear 72 for operating the usual chain drum. A pawl 74 is provided for performing the same functions as the pawl 43 shown in Fig. 2 of the drawings, the pawl 74 being pivotally mounted on a pin 75 secured to the housing and being adapted normally to engage the ratchet wheel 69. The pawl 74 is adapted to be actuated through the medium of an arm 77 formed thereon, which arm is operatively engageable with the cam element 78 carried on a shaft 79 which is rotatably mounted in the housing.

According to the invention, the cam element 79 is adapted to be moved by means of a handle 80 secured to the pin 79, and is operatively associated with friction means for controlling the speed of rotation of the gear 72. The friction means comprises a shoe 81 which is engageable with the peripheral surface of the gear 72 and is pivotally mounted on a pin 83, and a pair of toggle members 84 and 85 interposed between the shoe 81 and a portion 86 of the housing, the toggle member 84 having one end pivotally connected by means of a pin 87 to the shoe and the opposite end similarly connected to the member 85 by means of a pin in 88. A link 90 is pivotally connected at one end to the pin 88 joining the toggle members, and at the other end to the cam 78 by a pin 91, which is disposed eccentrically of the shaft 79. The link 90 is of such a length that, with the handle 80 and the cam 78 in the normal position as shown in Fig. 6, the toggle members 84 and 85 are positioned out of alignment.

The upper end of the toggle member 85 extends into a recess 92 formed in the housing 58, but is prevented from engagement with the wall of the recess by a cushioning device comprising an annular member 94 having sliding engagement with the toggle member 85, and a coil spring 95, which is interposed between the annular member 94 and a collar 96 formed on the toggle member 85 adjacent the pin 88. The annular member 94 is adapted to engage the portion of the housing surrounding the recess 92 when the toggle members 84 and 85 are moved into alignment as shown in Fig. 7, in which position the force of the spring 95 is transmitted through the toggle members for urging the shoe 81 against the gear 72 under a predetermined pressure as hereinafter explained. Suitable means, such as bolts 97, may be provided for limiting movement of the annular member 94 away from the collar 96 on the toggle member 95, the bolts having sliding engagement in suitable apertures formed in the member 94 and in the collar.

It will be apparent that with the handle 80 in the normal position as shown in Fig. 6 of the drawings, the cam member 78 is so positioned with respect to the arm 77 that the pawl 74 is permitted to rest in locking engagement with the ratchet wheel 69 for preventing rotation thereof in a counterclockwise direction. At the same time, the link 90 secured to the cam element 78 is adapted to maintain the toggle members 84 and 85 in the normal position in which these members are held out of alignment, so that the shoe 81 is not subjected to the force of the spring 95.

If it is desired to effect an application of the brakes through the medium of the hand brake mechanism the usual hand wheel is operated to turn the shaft 67 and the ratchet wheel 69 and pinion 70 in a clockwise direction, thereby rotating the gear 72 and the chain drum associated therewith in a counterclockwise direction for winding up the brake chain as already explained. Upon completion of this operation to fully apply the brakes, the hand brake mechanism will automatically maintain the brakes applied by reason of locking engagement of the pawl 74 with the ratchet wheel 69 to prevent release rotation thereof, the handle 80 and the cam 78 being in the normal position as shown in Fig. 6 of the drawings.

When it is desired to effect the release of the brakes following a manual application, the handle 80 is moved toward the right-hand, the shaft 79 and cam member 78 being thereby rotated in a clockwise direction. As the cam member 78 approaches the position in which it is shown in Fig. 7 of the drawings, the cam member operates the pawl 74 through the medium of the arm 77 thereon so as to disengage the pawl from the ratchet wheel 69. At the same time, the cam member 78 acts through the medium of the pivot pin 91 and the link 90 to force the pin 88 and the connected ends of the toggle members 84 and 85 to the left, as viewed in the drawings, until said toggle members are substantially aligned as shown in Fig. 7.

The friction shoe 81 is thereby forced against the peripheral surface of the gear 72 under the pressure of the coil spring 95, which, with the annular member 94 engaging the portion 86 of the housing, exerts a pressure against the friction shoe through the medium of the toggle members 84 and 85.

The drag of the shoe 81 on the gear 72 is then sufficient to control the speed of rotation of the gear and of the associated chain drum, and the various members of the brake rigging are thereby prevented from suddenly shifting into release position at a dangerously rapid rate.

In order to insure complete release of the brakes, the handle 80 may then be moved farther to the right and beyond the position illustrated in Fig. 7, until the cam member 78 and the link 90 are operated to pull the toggle levers 84 and 85 out of alignment so as to relieve the friction shoe 81 of the force of the spring 95 as hereinbefore explained, while the pawl 74 is maintained out of locking engagement with the ratchet wheel 69 by engagement with the cam member 78. A relatively small force is then permitted to effect unwinding of any portion of the brake chain remaining on the brake drum associated with the gear 72, so that the brakes on the car may be fully released. After the release of the brakes has been effected, the handle 80 should be returned to the normal position as shown in Fig. 6 of the drawings.

As shown in Figs. 9 and 10 of the drawings, the hand brake operating mechanism may be provided with control means embodying another form of the invention, in which the braking or retarding force employed for controlling the speed of the chain drum is governed automatically. Referring to Fig. 9, the hand brake operating mechanism comprises a housing 100 having journaled therein a shaft 101 carrying a ratchet wheel 102 and a pinion 103, which pinion operatively engages a gear 104 having formed thereon a chain drum 105, the gear and drum being keyed on a shaft 106 rotatably mounted in the housing.

In this embodiment of the invention, the housing 100 carries an annular or cylindrical brake drum 108, which is disposed concentrically of the shaft 106 and gear 104 and which extends inwardly toward the gear. The gear 104 is provided with a pair of centrifugally operated friction shoes 110 and 111 adapted to cooperate with the stationary drum 108 for controlling the speed of rotation of the gear and the chain drum 105 when the brakes are being released, the ends of the shoes 110 and 111 being pivotally mounted on pins or rivets 112 and 113, respectively, which are secured to the gear at opposite sides of the central shaft 106. The friction shoes are alike in structure, each having a braking surface 115 formed adjacent the pivoted end and suitably curved to fit the circular drum 108, and a long arm portion terminating in a weight portion 116. Each of the shoes 110 and 111 is yieldingly urged inwardly and away from the stationary drum 108 under the tension of a spring 117 connected to the shoe and the chain drum 105. Inward movement of each shoe is limited by one of a pair of stops 118 carried by the gear 104 and engageable with the weight portion of the shoe.

An application of the brakes may be effected by manual operation of the hand brake mechanism in the same manner as has already been explained in connection with the other embodiments of the invention. When it is desired to effect the release of the brakes, the usual pawl 120 is operated by means of the handle 121 out of locking engagement with the ratchet wheel 102, and with the ratchet wheel and associated gear 104 free to rotate to permit unwinding of the brake chain, the members of the brake rigging on the car will begin movement toward release position.

As the brake chain is unwound from the revolving drum 105, however, the shoes 110 and 111 become operative to prevent any tendency of the rigging members to move with such force and velocity as might cause the usual brake cylinder push rod to deliver too hard a blow against the brake cylinder piston. If the speed of rotation of the chain drum 105 and gear 104 is increased to a predetermined degree due to release operation of the brake rigging, the friction shoes 110 and 111 are thrown outwardly due to the effect of the centrifugal force acting on the weight portions 116, so that the braking surfaces 115 on the shoes engage the stationary drum 108 for checking further increase in the speed of rotation. The force with which the shoes 110 and 111 are urged against the drum 108 is thus determined by the speed at which the shaft 106 is rotated by the unwinding of the brake chain from the drum 105 in releasing the brakes.

When the force with which the members of the brake rigging move toward release position is somewhat spent, the rate at which the brake chain is unwound from the drum 105 is consequently slackened, so that the centrifugal force of the shoes 110 and 111 revolving with the gear 104 is reduced sufficiently to permit the springs 117 to retract the associated friction shoes from braking engagement with the stationary drum 108. The gear 104 and associated elements of the hand brake mechanism are thus freed from any retarding force for insuring a complete release of the brakes.

It will thus be apparent that a hand brake operating mechanism constructed in accordance with my invention may be actuated to effect the release of the brakes following a manual application thereof, the release operation being automatically controlled so as to prevent violent and dangerous release action of the members of the brake rigging of the car.

Although I have described three illustrative embodiments of the invention in detail, it is not my intention to limit its scope to those embodiments or otherwise than by the terms of the appended claims.

Having now described my invention what I claim as new and desire to secure by Letters Patent is:

1. In a car hand brake mechanism of the class having a rotary element adapted to be rotated in one direction to effect an application of the brakes and rotatable in another direction for permitting the release of the brakes, in combination, a braking means engageable with said element for controlling the speed of rotation thereof, a spring, and manually operable means for urging said braking means against said rotary element under the pressure of said spring in releasing the vehicle brakes following an application thereof by said hand brake mechanism.

2. In a railway car hand brake apparatus including a chain drum adapted to be manually rotated in one direction for effecting an application of the brakes and rotatable in the opposite direction in releasing of the brakes, and a ratchet and pawl mechanism for locking said hand brake apparatus in brake application position, the combination of a braking means for limiting the speed of rotation of said chain drum, yielding means, and manually controlled means for effecting operation of said drum braking means through the medium of said yielding means while actuating said pawl for effecting the release of the vehicle brakes.

3. In a railway hand brake apparatus of the type including a chain drum adapted to be manually rotated in one direction for effecting an application of the brakes and rotatable in the opposite direction in releasing the brakes, and an interengaging ratchet and pawl mechanism for locking said hand brake apparatus in brake application position, in combination, a braking means for limiting the speed of rotation of said chain drum, and manually operable means for controlling both said pawl and said drum braking means regardless of the will of the brakeman, said manually operable means requiring movement from hand brake locking position first to an intermediate position, for applying said drum brake while disengaging said pawl for permitting operation of the hand brake apparatus to initiate the release of the vehicle brakes, and then to a release position beyond said intermediate position, for holding said pawl in disengaged position while releasing said drum braking means to insure complete release of the vehicle brakes.

4. In a hand brake apparatus of the railway type having a chain drum adapted to be manually rotated in one direction for effecting an application of the brakes and rotatable in the opposite direction during release of the brakes, and a ratchet and pawl mechanism for locking said hand brake apparatus in brake application position, the combination of a braking means for limiting the speed of rotation of said chain drum, a cam for actuating the pawl in said ratchet and pawl mechanism, a device for actuating said drum braking means, and common means manually movable for jointly operating said cam and said device regardless of the will of the brakeman.

5. In a railway hand brake mechanism of the type including a manually operable element adapted to be rotated in one direction to effect an application of the brakes and rotatable in the opposite direction to permit release of the brakes; a release control mechanism therefor comprising friction means engageable with said element for controlling the speed of rotation thereof, a spring, and a manually operable eccentric device for moving said friction means into engagement with said element under the pressure of said spring in effecting the release of the vehicle brakes.

6. In a railway hand brake mechanism of the type including a manually operable element adapted to be rotated in one direction to effect an application of the brakes and rotatable in the opposite direction to permit release of the brakes; a release control mechanism therefor comprising friction means engageable with said rotary element for controlling the speed thereof, a spring, a pair of toggle levers operative in a certain position to urge said friction means into braking engagement with said rotary element under the pressure of said spring, and manually operable means for moving said toggle levers into and out of said position.

7. In a railway hand brake apparatus of the class having a chain drum adapted to be manually rotated in one direction for effecting an application of the brakes and rotatable in the opposite direction in effecting the release of the brakes, and a ratchet and pawl mechanism for locking said hand brake apparatus in brake application position, the combination of a braking means for limiting the speed of rotation of said chain drum, a toggle mechanism operative in a certain position to apply said braking means to the drum under pressure, and a manually operable cam for actuating the pawl in said ratchet and pawl mechanism and operatively connected to said toggle mechanism.

8. In a railroad hand brake mechanism involving a shaft adapted to be rotated in one direction for effecting an application of the brakes and rotatable in the opposite direction in releasing the brakes, the combination therewith of a stationary friction drum disposed concentrically of said shaft and having an interior braking surface, one or more brake shoes pivotally mounted on said shaft, and means for causing said shoes to be operated by centrifugal force to engage said braking surface for controlling the speed of rotation of said shaft.

9. In a hand brake apparatus for a railway vehicle involving a shaft adapted to be rotated in one direction for effecting an application of the brakes and rotatable in the opposite direction in releasing the brakes, the combination therewith of a stationary friction drum disposed concentrically of said shaft and having an interior braking surface, one or more brake shoes pivotally mounted on said shaft, means for causing said shoes to be operated by centrifugal force to engage said braking surface for controlling the speed of rotation of said shaft, and biasing means urging said shoes away from said stationary drum.

10. Automatic release control mechanism for a railway hand brake of the type including a rotary element adapted to be revolved during release of the brakes, comprising a brake shoe means adapted for operation into and out of frictional engagement with a braking surface associated with said rotary element for controlling the speed of operation thereof, said shoe means being constructed and arranged to automatically engage said surface during release rotation of the rotary element regardless of the attention of the operator.

11. Automatic release control mechanism for a railway hand brake of the type including a rotary element adapted to be revolved during release of the brakes, comprising brake shoe means adapted for braking cooperation with said rotary element for checking the speed of rotation thereof, and means associated with said brake shoe means and automatically operative upon initiation of release operation of the hand brake to insure operation of said brake shoe means regardless of the will of the brakeman.

12. Automatic release control mechanism for a railway hand brake of the type including a rotary gear wheel and a ratchet and pawl device for holding and releasing said gear wheel, said control mechanism comprising a brake shoe member adapted to be operated into and out of braking relation with the gear wheel for retarding the speed of rotation thereof, and means automatically operated upon release operation of said ratchet and pawl device for forcing said brake shoe member into braking relation with said gear wheel during at least a portion of the period of release operation of the hand brake.

13. In a release control mechanism for a railway car hand brake apparatus of the class having a chain drum, a ratchet wheel geared thereto and a movable pawl adapted to engage the ratchet wheel for holding the brakes applied; braking means cooperable with the chain drum for retarding the speed of release movement thereof, and means automatically rendered operative in response to each and every movement of said pawl out of engagement with said ratchet wheel for effecting operation of said braking means, whereby the brakeman is prevented from effecting an excessively rapid release of the brakes.

14. In a release control mechanism for a railway car hand brake including holding means for maintaining the brakes applied, the combination therewith of snubbing means for the braking means rendered automatically operative, upon manipulation of said holding means to release the brakes, to check the speed of release operation of the hand brakes, said snubbing means being constructed and arranged to prevent interference with the release retarding operation thereof by the brakeman.

15. In a railway hand brake mechanism of the type including a manually operable element adapted to be rotated in one direction to effect an application of the brakes and rotatable in the opposite direction to permit release of the brakes; a release control mechanism therefor comprising friction means engageable with said rotary element for controlling the speed thereof, a spring, and a manually operable eccentric device normally adapted for holding said friction means away from said element and automatically operative to force said friction means into braking engagement with said element under the pressure of said spring as the vehicle brakes are released.

16. In a hand brake apparatus of the railway type having a chain drum adapted to be manually rotated in one direction for effecting an application of the brakes and rotatable in the opposite direction during release of the brakes, and a ratchet and pawl mechanism for locking said hand brake apparatus in its brake application position, the combination of a braking means for limiting the speed of rotation of said drum, a manually operable cam for actuating the pawl of said ratchet and pawl mechanism, and an eccentric device cooperative with said cam as the brakes are released for causing said braking means to apply a predetermined braking force to said chain drum regardless of the will of the brakeman.

CLYDE C. FARMER.